United States Patent [19]

Born

[11] Patent Number: 5,085,766
[45] Date of Patent: Feb. 4, 1992

[54] FILTER FOR CLEANING FLUIDS

[75] Inventor: Rainer Born, Achim, Fed. Rep. of Germany

[73] Assignee: ME/BO/CO Verfahrenstechnik GmbH & Co. KG, Achim-Baden, Fed. Rep. of Germany

[21] Appl. No.: 409,565

[22] Filed: Sep. 19, 1989

[30] Foreign Application Priority Data

Sep. 19, 1988 [DE] Fed. Rep. of Germany ... 8811851[U]

[51] Int. Cl.$^5$ .................... B01D 33/00; B01D 39/00; C02F 3/08
[52] U.S. Cl. .................... 210/150; 55/282; 55/387; 55/477; 55/512; 210/615; 435/288
[58] Field of Search .................. 55/74, 387, 477, 304, 55/282, 490, 512; 422/168, 177; 435/266, 288, 311; 210/150, 151, 615, 694

[56] References Cited

U.S. PATENT DOCUMENTS

| | | | |
|---|---|---|---|
| 605,234 | 6/1898 | Sherk | 55/477 |
| 741,210 | 10/1903 | Young | 55/477 |
| 3,977,847 | 8/1976 | Clark | 55/477 |
| 4,088,571 | 5/1978 | Helgesson | 210/615 |
| 4,167,482 | 9/1979 | Müller | 55/477 |
| 4,294,694 | 10/1981 | Coulthard | 210/150 |
| 4,655,924 | 4/1987 | Heijnen | 210/603 |
| 4,662,900 | 5/1987 | Ottengraf | 55/223 |
| 4,681,851 | 7/1987 | Baumgarten et al. | 210/601 |
| 4,734,111 | 3/1988 | Hoffmann et al. | 55/487 |
| 4,877,534 | 10/1989 | Nishida et al. | 55/387 |

FOREIGN PATENT DOCUMENTS

| | | | |
|---|---|---|---|
| 1239939 | 7/1960 | France | 55/477 |
| 178794 | 4/1962 | Sweden | 55/477 |
| 1315129 | 4/1973 | United Kingdom | 210/615 |

Primary Examiner—Jay H. Woo
Assistant Examiner—James P. Mackey
Attorney, Agent, or Firm—Herbert Dubno

[57] ABSTRACT

The filling of a filter for removing contaminants from air and other fluid is constituted by hanging freely-moving foil strips coated with active carbon and provided with a microorganism culture for biodegradation of the contaminants. Excess culture and detritus from the biodegradation fall out of the filling as the fluid passes downwardly therethrough.

8 Claims, 2 Drawing Sheets

FILTER FOR CLEANING FLUIDS

FIELD OF THE INVENTION

My present invention relates to a filter for cleaning fluids and, more particularly, to a filter of the type in which active carbon participates in the cleaning action. The filter is particularly useful for the deodorizing and removal of the contaminants from exhaust air, for the removal of organic components entrained in air and for the cleaning of gases generally which are to be released into the atmosphere or to be delivered to a protected location.

BACKGROUND OF THE INVENTION

Filters which use active carbon to trap the substances imparting noxious odors to air or which can be considered as contaminants of air, are provided for a wide variety of purposes. For example, they may be used at the discharge side of blowers or the like drawing air from paint-spray booths or regions in which odors are generated. They may be employed wherever hydrocarbons are released into the atmosphere to trap these hydrocarbons at least in part before the air is discharged into the environment.

They may be used upstream of workplaces or other populated locations to protect the population from contaminants which might otherwise be present in the incoming air and, generally can be utilized wherever it is required, desirable or advantageous to remove adsorbable or catalytically modifiable contaminants of toxic, noxious or simply unwanted nature.

In the past, such filters have utilized a filling in the form of a pile of active carbon granules. When the absorption capacity of the active carbon is diminished, the filling must be replaced.

The used active carbon can be destroyed by a thermal treatment at a temperature in excess of 1200° C. at comparatively high cost. It can also be desorbed by the use of steam or other conventional methods. However desorption results in the production of liquid, gaseous or vapor-like materials which can also pose disposal problems.

It has been proposed, in parallel with absorption or adsorption on active carbon, to effect a biochemical modification of the contaminants on the active carbon so as to reduce the rate at which the active carbon might lose its capacity to take up the contaminants. For this purpose, the active carbon may be seeded with appropriate microorganism colonies or populations which can break down the deposited organic contaminants entrained onto the active carbon by the air and can also break down contaminants which remain entrained in the air, these contaminants serving as nutrients for the respective cultures. Thus removal of contaminants is enhanced by a direct action of the microorganism colonies upon nondeposited nutrients and accumulation of contaminants is prevented by the breakdown of deposited contaminants.

In such systems, however, there is a problem with respect to controlling the important parameters like nutrient availability, namely, organic components entrained with the exhaust air, oxygen supply and moisture supply so that an appropriate equilibrium is maintained which can sustain the biological activity on the one hand, but on the other hand will not produce such a growth of the cultures or populations of microorganisms that the interstices between the active carbon grains are obstructed.

Obviously, in most cases, it is difficult, if not impossible to control the air contamination and moisture levels to ensure that uncontrolled growth of the microorganism cultures into the interstices between the granules will not occur.

OBJECTS OF THE INVENTION

It is, therefore, an important object of the present invention to provide a filter for the purposes described which utilizes a biochemical material exchange or action as described but wherein an increase in the flow resistance by growth of the microorganism cultures does not arise, is not significant, or does not materially affect the operation of the filter.

Another object of this invention is to provide an improved filter for the aforedescribed purposes which avoids drawbacks of earlier filters utilizing the active carbon and microorganism cultures or populations which act upon the contaminants of air passing through that filter.

SUMMARY OF THE INVENTION

These objects and others which will become apparent hereinafter, are attained in accordance with the invention through the use of a filling of the filter constituted by flexible, unordered and uncontrollably movable foil strips of a synthetic resin material which are coated with active carbon and are seeded with a microorganism culture suitable for biodegradation of the contaminants.

With such a filter, a growth of the microorganism culture to increase the volume or mass of the filling and possibly create obstruction is largely excluded because the foil strips are randomly moved freely by the air flowing past them so that flow passages are rinsed by the air or new flow passages are continuously created.

When the foil strips, in accordance with a feature of the invention, are suspended and hang freely and the filter is traversed from above downwardly by the airstream, the movement of the strips by the airstream provides an especially effective clearing of any materials which otherwise might be obstructive.

Excessive microorganism culture, namely portions of the culture which grow out from the active carbon layer, are broken away and dead biological materials, detritus of the biodegradation, biodegradation products and the like are transported away and fall from the filling. These materials of a solid nature can be readily collected in a conventional manner by a bag, electrostatic or cyclone-type filter.

With foil-strip fillings in accordance with the present invention, I am able to realize filter surface areas of up to 400 $m^2/m^3$, preferably 200 to 300 $m^2/m^3$.

The foil strips can have unlimited lengths and advantageously have a width between 2 cm and 6 cm although even wider strips can be used if desired. The foil thickness is not critical and can range from 0.1 micrometer to 0.5 micrometer, for example. The only limit with respect to thickness, of course, is the flexibility. It is important that the foil strips be able to undulate and move in the air flow. The strips may be composed of substantially any synthetic resin foil and substantially the only limitation is that the foil strips not be affected by the temperature and flow velocity of the air stream. Polyethylene and polypropylene strips may be employed.

The strips can have smooth surfaces or surfaces which are embossed to provide patterns thereon to increase the interconnection between the strips and the air or the strips themselves can be shaped by an embossing process.

The handling of the foil strips, especially upon replacement of the filling of the filter is simplified if the foil strips are assembled into bundles. Because it is important that the strips do not order themselves in fixed positions during operation, I have found it to be advantageous to twist the foil bundles at their centers and to hang the foil bundles from support bars from the twisted regions. The foil strips can be affixed to the support bars via their twisted regions as well.

The filter of the invention can be used not only for the cleaning of waste air but for the cleaning of other fluids as well, such as in the cleaning of waste water or the like. It has been found to be advantageous, where the filter is to be used to clean liquid streams, to weight the free ends of the foil strips or to fasten them in such fashion as to prevent the strips from floating up.

Neither weighting nor fastening of the foil strips is required in the use of the filter in a trickle tower where the liquid phase is in the form of droplets.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
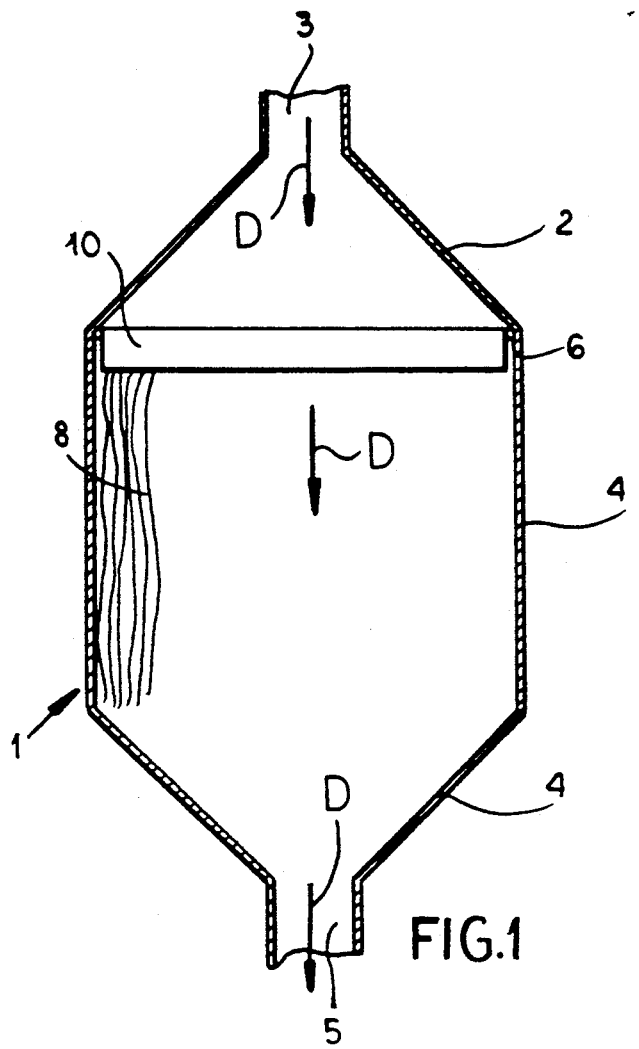
FIG. 1 is a diagrammatic vertical section through a filter for use in air cleaning.

In the drawing (see FIG. 1) I have shown a filter which comprises a housing 1 formed with a peripheral wall 4 whose upper end 2 is funnel-shaped and is connected to an inlet pipe 3. The lower end of this housing is likewise funnel-shaped and transitions to an outlet pipe 5.

Figure 2:
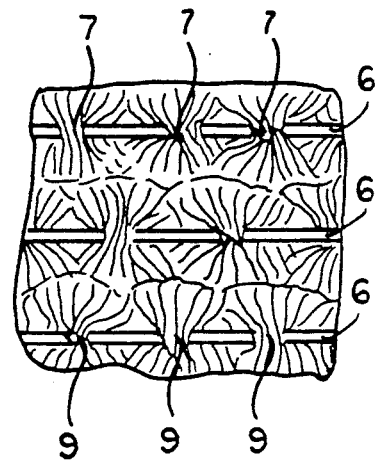
FIG. 2 is a plan view showing the bundles of foil strips according to the invention hanging from an array of support bars for the filter of FIG. 1.
Figure 7:
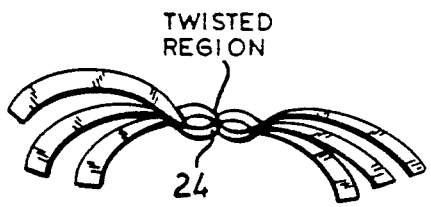
FIG. 7 is an elevational view of a bundle of foil strips showing the twisted central region.

Below the upper end 2, a row of support bars 6 is provided. These bars 6 are shown in greater detail in FIG. 2 and their cooperation with bundles of strips is also described in connection with FIGS. 4 and 7. The bars 6 extend across the flow path of the fluid and over the cross section of the housing.

Bundles 7 of foil strips 8 are hung over the support bars 6.

Figure 3:
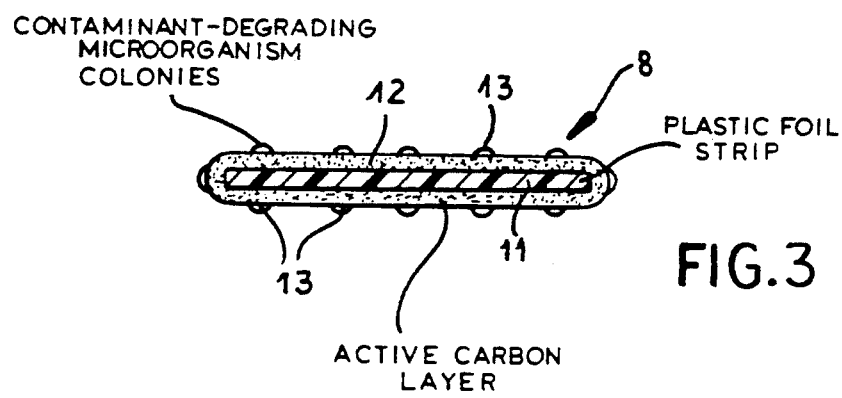
FIG. 3 is a cross sectional view, greatly enlarged in scale with respect to FIGS. 1 and 2 showing a foil strip of the invention.

As can be seen from FIG. 3, each of the foil strips 8 can comprise a plastic foil substrate 11 which is coated at 12 with a layer of active carbon. The active carbon layer, in turn, is seeded with colonies 13 of a contaminant-degrading microorganism.

Figure 4:
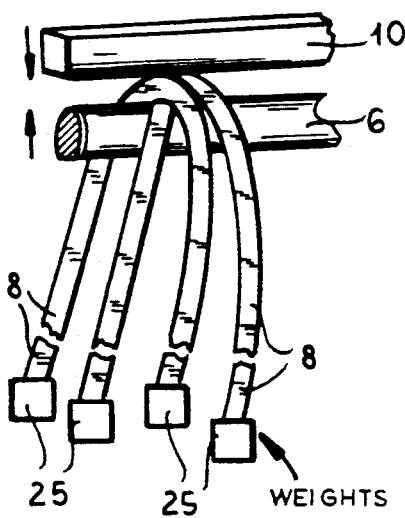
FIG. 4 is a diagrammatic perspective view illustrating how the foil strips are held in place.
Figure 8:
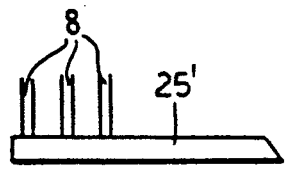
FIG. 8 is an illustration of another method of holding the ends of the foil strips in the case in which water is a fluid to be cleaned.

As can be seen from FIG. 4, the foil strips 8 hang downwardly from the support bars 6 (see FIG. 1) and can extend substantially the entire length of the housing therein. In FIG. 1 the free ends of the foil strips 8 are shown to hang loosely. However, when a liquid is treated in the filter in which the strips can float, individual weights 25 can be provided at the free ends (see FIG. 4) as well as the free ends can be fastened together by means for fastening 25' for preventing the strips from floating upwardly (see FIG. 8).

The bundles 7 are gathered at their central regions 9 and held together by these gatherings. In a preferred embodiment, the gathering may be formed by a twisted region 24 (FIG. 7) at which the bundle hangs over the bar 6 and can be held in place by a profiled element 10 shown only diagrammatically in FIG. 4 and which clamps the bundle against the bar at the respective twisted region.

Between the profiles 10 sufficient space must be provided to allow the passage of the air to be cleaned.

The air to be cleaned flows through the filling constituted by these bundles of gathered foil strips 8 from above, downwardly at a direction indicated by an arrow D in FIG. 1. Entrained noxious materials, noisome materials, toxic and other contaminants and organic contaminants are absorbed and adsorbed on the active carbon and/or are biochemically degraded by the cultures in the air or on the active carbon.

The growth of the cultures to obstruct the flow cross section is prevented as has been described. Biological detritus can be removed from the stream by any conventional particulate separation technique.

Figure 5:
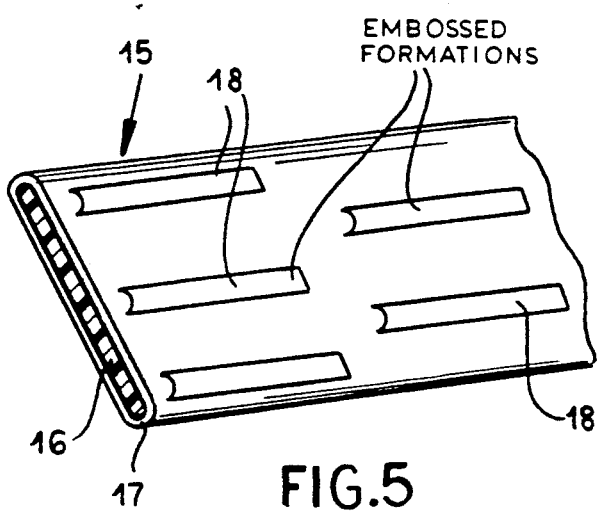
FIG. 5 is a perspective view, partly in section, showing an embossed surface on the foil strips.
Figure 6:
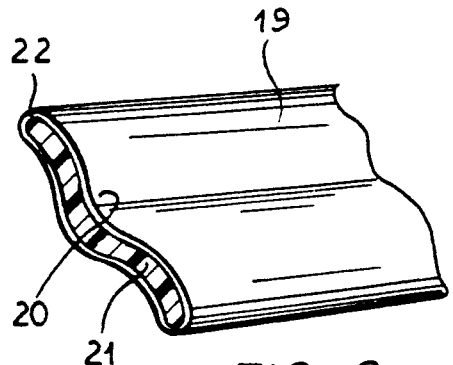
FIG. 6 is a view similar to FIG. 5 illustrating embossing shaping of the strip itself.

As can be seen from FIG. 5, the surfaces of the foil strip 15 having the synthetic resin core 16 and the active carbon layer 17 inoculated with the microorganism culture can be embossed on its surfaces to provide formations 18 which increase the contact area of the air with the strip. Increased contact area can also be provided by contouring or embossing the foil strip as a whole as can be seen in FIG. 6 where contours 20 are provided by both the core 21 and the active carbon layer 22 which is seeded with the microorganism.

I claim:

1. A filter for cleaning a fluid, comprising:
a housing having an inlet and an outlet and traversed by said fluid from said inlet to said outlet;
a plurality of support bars disposed in said housing between said inlet and said outlet; and
a filling in said housing comprising a multiplicity of flexible, unordered, nonuniformly moving foil strips composed of a synthetic resin, coated with active carbon and carrying a contaminant-degrading biological culture, said strips being gathered in bundles twisted together in central regions thereof and suspended from said support bars with said twisted central regions lying over and clamped against said support bars and said strips hanging down therefrom, said bundles of strips being fastened to said support bars at said twisted central regions.

2. The filter defined in claim 1 wherein said filling has a filter area of the foil strips of up to 400 $m^2/m^3$.

3. The filter defined in claim 2 wherein said filter area of the foil strips is 200 to 300 $m^2/m^3$.

4. The filter defined in claim 3 wherein said foil strips have smooth surfaces.

5. The filter defined in claim 3 wherein said foil strips have embossed surfaces.

6. The filter defined in claim 3 wherein said foil strips are embossed to provide an increased contact area between said foil strips and said fluid.

7. The filter defined in claim 3, further comprising means for weighting free ends of said strips.

8. The filter defined in claim 3, further comprising means for fastening lower ends of said strips to prevent said strips from floating upwardly.

* * * * *